UNITED STATES PATENT OFFICE.

BENTON DALES, OF AKRON, OHIO, ASSIGNOR TO THE B. F. GOODRICH COMPANY, OF NEW YORK, N. Y., A CORPORATION OF NEW YORK.

INK.

1,404,345.          Specification of Letters Patent.      Patented Jan. 24, 1922.

No Drawing.     Application filed March 23, 1921. Serial No. 454,719.

*To all whom it may concern:*

Be it known that I, BENTON DALES, a citizen of the United States, residing at Akron, in the county of Summit and State of Ohio, have invented a certain new and useful Ink, of which the following is a specification.

This invention relates to coloring materials to be used in a liquid or viscous form, and more particularly to materials such as printing-inks which are applied to print sheets by printing forms, and it has for its principal objects to provide an improved body for pigment spreading mediums, which body is substantially or wholly free from oils, or the like, and more especially to provide an improved printing-ink which will not injure rubber-composition ink-distributing rollers, and may be easily removed from the rollers without the use of cleaning agents which are inflammable or are harmful to rubber-compositions. A further object is to provide an ink which may be removed from the material on which a print has been made without leaving a discoloring residue in the material.

A non-oleaginous, viscous solution which will not set or jell forms an excellent pigment carrying medium, for if such a solution dries upon exposure to the atmosphere it can be readily restored to the proper consistency for use by adding a solvent and stirring until the solution is uniform. While it is within the scope of my invention to use oils in limited quantities, a coloring material made in accordance with the present invention is in contrast with coloring materials, such as printing-inks, now commonly used in that it does not have an oil base.

In carrying out my invention I use as a base a viscous water solution comprising a non-gelatinizing substance, this base serving as a vehicle for the pigment which is preferably worked as a powder into the vehicle thus forming a non-setting, liquid, coloring material having the pigment suspended therein. When the particle size of the pigment used is relatively small the pigment is suspended in a colloidal state. I may also add to the solution a sirupy liquid such as glycerine or corn sirup, to retard the rate of drying on the rollers or type of a press, the amount of the sirup used being proportioned also to the spongy character of the material on which a print is to be made so as to control the drying of the print. The consistency of the non-setting vehicle may be controlled, in whole or in part, by varying the proportional amount of water present.

I have found that water solutions of the soluble salts of alginic acid and more especially the alkali-metal salts such as sodium alginate, or, as it is commonly termed, "algin," form excellent pigment vehicles which do not set and which hold a pigment such as carbon black suspended indefinitely and that the drying properties of such a vehicle may be easily controlled by the addition of glycerine or similar substances. For printing-ink the vehicle is made of about the viscosity of, or even thicker than glycerine, and the sirup for controlling the drying of the solution is preferably made of about the same consistency before mixing it with the vehicle.

By way of example, in the manufacture of printing-ink I may take by weight, 7 parts of algin, 100 parts of water, 75 parts of glycerine, 18 parts of carbon black, and 1 part of indigo. The algin being first dissolved in the water, the glycerine is added, and the carbon black and indigo are mixed in, after which the ink is ready for use. These proportions, however, may be varied, only one pigment need be used, and the pigment may be dissolved or suspended in the base. The indigo is found to improve the color, but it may be omitted or a substitute pigment used, and other pigments may also be employed in place of carbon black.

An ink of this character will adhere to printing-ink-distributing rollers and to the type of a press, and it is readily transfered from the type to print paper, where it dries quickly. The rollers and type may be cleaned by wiping them with a cloth wet with warm water, and neither the ink nor the water will injure the rollers when the latter are made of rubber-composition. This is a great advantage since one of the principal objections to the use of rubber rollers heretofore has been that they are attacked by the oil in the oil-base inks commonly employed.

The water-soluble salts of alginic acid and more especially the sodium salt when used, even in small quantities in solution are quite viscous and may be used to advantage as drying agents in inks or analogous coloring compositions.

The ink is absorbed entirely or in part by print paper, but may be removed therefrom by macerating the paper, dissolving out the ink, and decanting off or otherwise removing the liquid, leaving the paper substance free from any substantial amount of discoloring residue and in condition to be made again into good print paper.

I claim:

1. A printer's ink comprising a viscous water solution of a salt of alginic acid, and a solid pigment suspended therein.

2. A printer's ink comprising a mixture of a viscous solution of an alkali salt of alginic acid, and a sirup for retarding the drying of the solution, and a pigment suspended therein.

3. A printer's ink comprising a mixture of a water solution of algin, a sirup, and a pigment, said mixture having a viscosity greater than or substantially the same as that of glycerine.

4. In a printer's ink, a pigment vehicle comprising a water solution of an alkali salt of alginic acid, a water-soluble substance for controlling the drying thereof, and a pigment suspended in the vehicle in a collodial state.

5. In an ink, a viscous solution comprising a water-soluble salt of alginic acid, and glycerine, and a pigment carried thereby.

6. In a printer's ink, a water solution of algin, and a pigment suspended therein in a colloidal state.

7. An ink comprising algin, glycerine, and a pigment.

8. An ink comprising by weight substantially 7 parts of algin, 100 parts of water, the algin being dissolved in the water, and a solid pigment suspended therein.

9. A printer's ink comprising by weight substantially 7 parts of algin, 100 parts of water, 75 parts of glycerine, and 18 parts of carbon black.

In witness whereof I have hereunto set my hand this 18th day of March, 1921.

BENTON DALES.